US008678506B2

(12) United States Patent
Beneker et al.

(10) Patent No.: US 8,678,506 B2
(45) Date of Patent: Mar. 25, 2014

(54) FRAME OF A VEHICLE SEAT

(75) Inventors: Wilfried Beneker, Leichlingen (DE);
Nils Magnus, Remscheid (DE); Nikolay Redkin, Duisburg (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 28 days.

(21) Appl. No.: 12/274,537

(22) Filed: Nov. 20, 2008

(65) Prior Publication Data
US 2009/0127913 A1 May 21, 2009

(30) Foreign Application Priority Data

Nov. 20, 2007 (DE) .................. 10 2007 055 602

(51) Int. Cl.
A47C 7/02 (2006.01)
(52) U.S. Cl.
USPC .................. 297/452.18; 297/463.2
(58) Field of Classification Search
USPC ............ 297/440.12, 452.18, 452.38, 463.2
See application file for complete search history.

(56) References Cited

U.S. PATENT DOCUMENTS

| | | | | |
|---|---|---|---|---|
| 2,833,339 A * | 5/1958 | Liljengren | ................. | 297/216.1 |
| 3,166,831 A * | 1/1965 | Keith | ........................ | 29/897.32 |
| 3,602,110 A * | 8/1971 | Wiggins | .......................... | 404/40 |
| 3,647,168 A * | 3/1972 | Eggert et al. | ............... | 244/122 A |
| 3,670,393 A * | 6/1972 | Almond | ........................... | 29/423 |
| 3,815,215 A * | 6/1974 | Medawar | ....................... | 29/460 |
| 3,866,305 A * | 2/1975 | Conn, Jr. | ........................ | 228/160 |
| 4,053,667 A * | 10/1977 | Smith | ........................... | 428/36.1 |
| 4,350,390 A * | 9/1982 | Ogawa | ........................ | 297/452.18 |
| 4,399,642 A * | 8/1983 | Bard et al. | .................. | 52/483.1 |
| 4,433,517 A * | 2/1984 | Moore, Jr. | .................. | 52/204.55 |
| 4,603,903 A * | 8/1986 | Moscovitch | ............. | 297/256.11 |
| 4,889,355 A * | 12/1989 | Trimble | ..................... | 280/281.1 |
| 5,015,038 A * | 5/1991 | Mrotz, III | ................ | 297/452.15 |
| 5,064,247 A * | 11/1991 | Clark et al. | ................ | 297/447.3 |
| 5,100,204 A * | 3/1992 | Makihara et al. | ........ | 297/452.65 |
| 5,326,155 A * | 7/1994 | Wild | ........................ | 297/452.38 |
| 5,405,178 A * | 4/1995 | Weingartner et al. | .... | 297/452.48 |
| 5,445,310 A * | 8/1995 | Folmer | ...................... | 228/173.6 |
| 5,924,769 A * | 7/1999 | Kao | ......................... | 297/411.44 |
| 6,059,369 A * | 5/2000 | Bateson et al. | ........ | 297/452.18 |
| 6,096,403 A * | 8/2000 | Wycech | ....................... | 428/122 |
| 6,131,993 A * | 10/2000 | Pesta et al. | .................. | 297/188.04 |
| 6,142,563 A * | 11/2000 | Townsend et al. | ........ | 297/216.1 |
| 6,149,241 A * | 11/2000 | Waku et al. | ................. | 297/463.2 |
| 6,264,412 B1 * | 7/2001 | Nakamura et al. | ........... | 411/352 |
| 6,287,666 B1 * | 9/2001 | Wycech | ....................... | 428/122 |
| 6,355,339 B1 * | 3/2002 | Sherwood | ................. | 428/309.9 |
| 6,688,700 B2 * | 2/2004 | Gupta et al. | ............ | 297/452.18 |

(Continued)

FOREIGN PATENT DOCUMENTS

EP 65116 A1 * 11/1982 ............. B60N 1/00
EP 248240 A1 * 12/1987 ............. B60R 13/02

(Continued)

Primary Examiner — David E Allred
(74) Attorney, Agent, or Firm — Cantor Colburn LLP

(57) ABSTRACT

The side part of a vehicle seat, meaning either a seat side part or a side part of a seat back, comprises a layered structure. It has at least two layers. A first layer is a sheet steel part determining the shape of the side part. A second layer is a reinforcement body that has a material thickness in the y direction that is greater than the material thickness of the sheet steel part.

17 Claims, 4 Drawing Sheets

(56) References Cited

U.S. PATENT DOCUMENTS

| | | | |
|---|---|---|---|
| 6,857,698 B2* | 2/2005 | Saberan et al. | 297/216.13 |
| 6,896,324 B1* | 5/2005 | Kull et al. | 297/216.1 |
| 7,083,230 B2* | 8/2006 | Kull et al. | 297/216.1 |
| 7,237,846 B1* | 7/2007 | Arima | 297/452.38 |
| 7,250,091 B2* | 7/2007 | Gupta et al. | 156/242 |
| 7,716,797 B2* | 5/2010 | Kismarton et al. | 29/91.1 |
| 7,954,762 B2* | 6/2011 | Boren et al. | 244/122 R |
| 2002/0005621 A1* | 1/2002 | Christophliemke et al. | 280/124.134 |
| 2004/0036326 A1* | 2/2004 | Bajic et al. | 297/180.14 |
| 2004/0148696 A1* | 8/2004 | Clarke | 4/619 |
| 2004/0155514 A1* | 8/2004 | Talley | 297/463.1 |
| 2007/0026252 A1* | 2/2007 | Voit et al. | 428/593 |
| 2009/0007326 A1* | 1/2009 | Bozic | 4/595 |
| 2009/0188100 A1* | 7/2009 | Durney et al. | 29/469 |
| 2010/0078985 A1* | 4/2010 | Mahoney et al. | 297/446.1 |
| 2010/0219674 A1* | 9/2010 | Sakkinen et al. | 297/452.18 |
| 2011/0169317 A1* | 7/2011 | Fujita et al. | 297/452.2 |
| 2012/0217775 A1* | 8/2012 | Fujita et al. | 297/216.13 |

FOREIGN PATENT DOCUMENTS

| | | | | |
|---|---|---|---|---|
| FR | 2561281 A1 | * | 9/1985 | E04B 1/76 |
| FR | 2890361 | * | 3/2007 | |
| GB | 2300434 | * | 11/1996 | |
| WO | WO 8704242 | * | 7/1987 | |

* cited by examiner

FRAME OF A VEHICLE SEAT

TECHNICAL FIELD OF THE INVENTION

The invention relates to a side part of a frame of a vehicle seat, namely to a seat frame side part or a side part of a seat back frame.

BRIEF DESCRIPTION OF RELATED ART

Such a side part or frame side part has been known from EP 233 822 B1. Similar frame side parts are also shown in the following documents: U.S. Pat. No. 6,264,275, EP 1 190 894 B1, U.S. Pat. No. 6,276,650 and DE 44 19 139 C2.

The frame side part should on the one side be capable of taking high loads, in particular crash loads, on the other side, it should have as little weight as possible. It has to perform its function as a structure element; usually, at least one rocker is articulated to the seat frame part, said rocker being in turn hinge-linked to a longitudinal guide. On side parts of a seat back frame, there is usually provided a bearing hole for a seat back hinge or for a connection to a hinge arm of a seat back hinge. Accordingly, discrete regions of the frame side part are specially formed to perform a function of bearing, of connecting to other parts or of retaining other parts.

BRIEF SUMMARY OF THE INVENTION

In view thereof, the invention develops a frame side part of a motor vehicle seat in such a manner that it has a lower weight than a comparable prior art component at increased or at least equal strength. Accordingly, the invention develops the frame side part of the type mentioned herein above for it to have a lower overall weight at at least equal strength.

In view of the previously known frame side part of the type mentioned herein above, the solution to this object is that the frame side part is built in layers, having at least two layers, that one layer is a sheet steel part determining the shape of the frame side part and that a second layer is a reinforcing member having a material thickness in the y direction that is greater than the material thickness of the sheet steel part.

This frame side part is built in layers or in a sandwich style. It has at least two layers, these two layers being made from different materials. A sheet steel part is still provided. The sheet steel part determines the shape of the frame side part. It has similarities with the sheet steel part used in prior art. But compared to the prior art sheet steel part, it may now be thinner and also of a lighter weight. It is stiffened by the reinforcement body, which forms the second layer. The reinforcement body may also be made from a light-weighted material such as a plastic material. The reinforcement body usually has in the y direction a thickness that is much greater, for example at least 5 times, preferably at least 10 times greater than the material thickness of the sheet steel part. Preferably, the reinforcement body is provided with recesses and/or perforations in order to save weight. It preferably has a mesh structure, in particular when viewed in the y direction.

The sheet steel part, meaning the first layer, is configured for meeting in principle all the mechanical demands placed on the frame side part. The strength however is insufficient. Sufficient strength is only achieved upon assembling it with the reinforcement body. Said reinforcement body substantially is a passive body, which reinforces the sheet steel part where reinforcement is needed to achieve sufficient strength. The reinforcement body may however also form bearing areas, preferably forming thin bearing rings that are mechanically supported by the sheet steel part.

A layered construction with three layers is preferred. Either a reinforcement body is sandwiched between the sheet steel part and another sheet steel part or there are two reinforcement bodies on either side of a sheet steel part. Thanks to the layered construction, one obtains very far reaching possibilities that can be used on purpose for the combined part to be configured to meet the respective mechanical demands. It is possible to use a sheet steel material that is much thinner than that used in prior art, highly resistant sheet steel being preferably utilized.

Usually, the frame side parts of the invention are portions of a substantially square frame. The at least one frame cross member extending in the y direction and needed therefore is connected to the frame side parts, the connection occurring at the sheet steel part. Preferably, the reinforcement bodies do not extend into the region of connection with the cross members.

An advantage of the invention is that now the sheet steel parts need no longer be deformed to the same extent as the prior art frame side parts. In prior art, attempts have been made to provide the frame side part with high strength by giving it a profile as clear as possible and by deforming it significantly. Deformation however has its limits. With the solution of the invention, strong deformation is no longer necessary; the additional reinforcement body favorably stiffens the frame side part. Accordingly, the invention cuts a new path.

In a preferred development, the sheet steel part is made from a piece of sheet steel of various thicknesses and/or of various material qualities. What are referred to as "tailored blanks" are intended to be utilized in particular. The material under discussion is an industrially made sheet steel material that is in the form of a coil for example; it has various thicknesses, and is for example in the form of strips of various thicknesses.

In an exemplary embodiment the reinforcement body is made from a material having a lower specific weight than the metal from which said sheet steel part is made, the difference being at least 50%. Preferably the sheet steel part has a wall thickness of less than 1.5 mm, and is made from highly resistant sheet steel having yield strength of more than 800 $N/mm^2$. Preferably said reinforcement body is made from a material having a lower specific weight than the metal from which said sheet steel part is made, the difference being at least 100%.

BRIEF DESCRIPTION OF THE DRAWINGS

Other features and advantages will become more apparent upon reviewing the appended claims and the following non restrictive description of embodiments of the invention, given by way of example only with reference to the drawing. In said drawing:

DETAILED DESCRIPTION OF THE INVENTION

Figure 1:
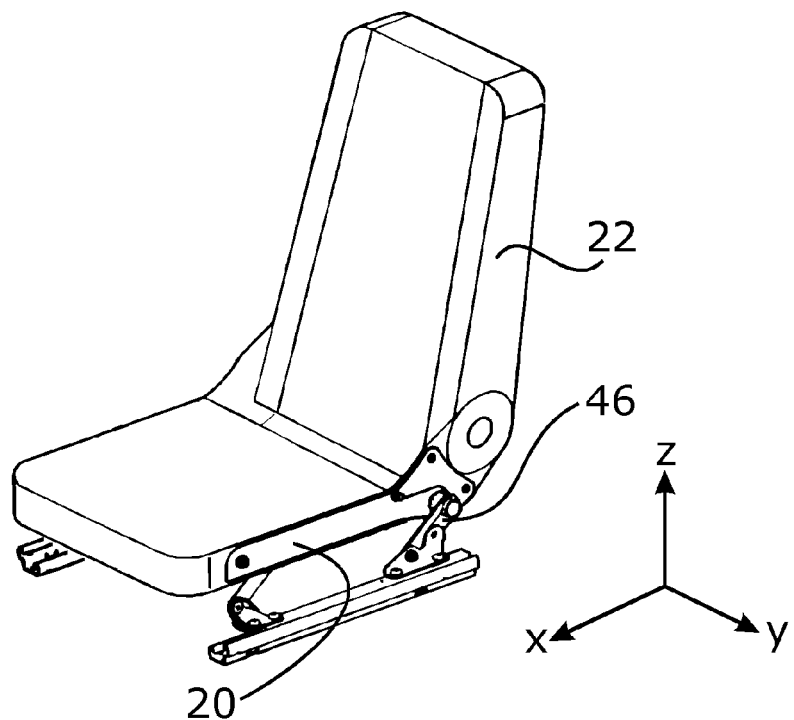
FIG. 1: is a perspective illustration of a vehicle seat with seat frame side parts and side parts of a seat back in accordance with the invention.

In a known way, the vehicle seat shown in FIG. 1 has four frame side parts, namely one left and one right seat frame side part 20 and one left and one right seat back frame side part 22. Except for the mirror inverted configuration, these frame side parts are built virtually identically.

Figure 2:
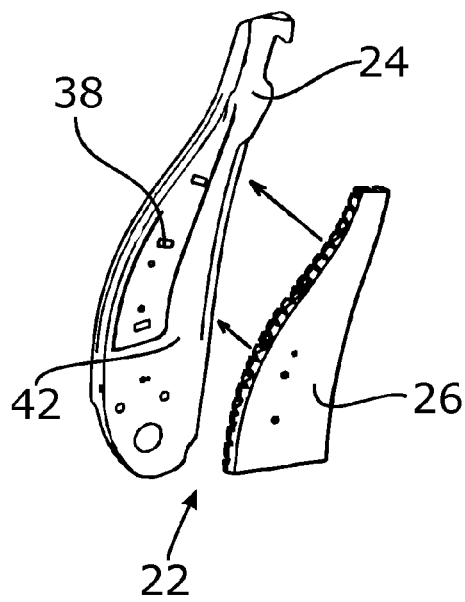
FIG. 2: shows a first exemplary embodiment in a perspective illustration of a right side part of a seat back (when viewed in the x direction) in the form of an assembly drawing.
Figure 3:
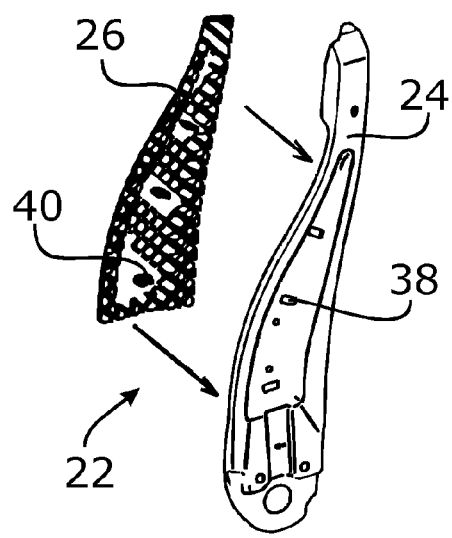
FIG. 3: is a perspective illustration like in FIG. 2, but now for the left side part of a seat back.
Figure 4:
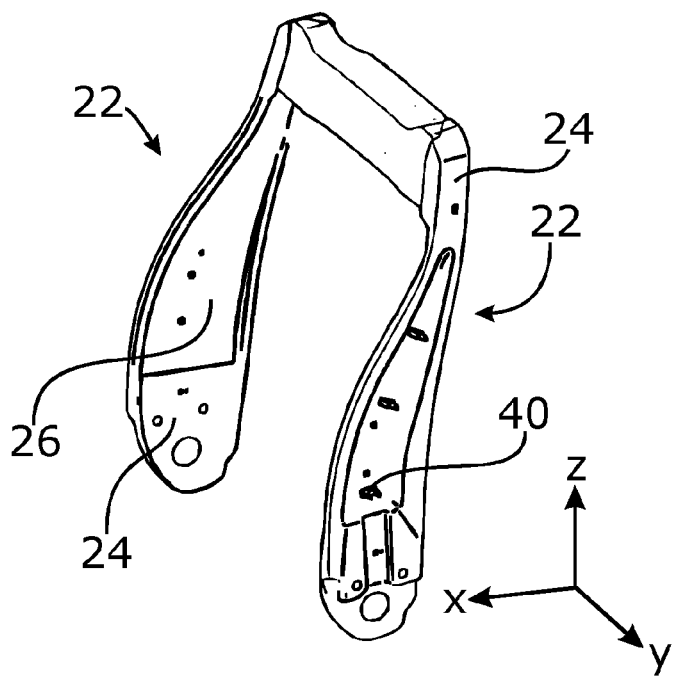
FIG. 4: is a perspective illustration of a mounted seat back frame with the two side parts thereof according to the FIGS. 2 and 3, FIG. 5: shows a second exemplary embodiment in the form of a side view of a side part of a seat back.

Herein after, the first exemplary embodiment will be described in accordance with the FIGS. 2 through 4. As can be seen from these Figures, the seat back side parts 22 are built in layers, they are formed with two layers. The first layer is formed by a sheet steel part 24 that virtually coincides with the sheet steel part 24 used hitherto in the art. As compared therewith, it can however be made from a thinner material, it needs not have by itself the total strength it had to meet in prior art.

A second layer is formed by a reinforcement body 26 that is made from a plastic material in the instant case, and may be a prefabricated, shaped part. It has a large number of recesses and of perforations in order to be light-weighted. It is made by injection molding. Its material thickness across the y direction is considerably thicker than the thickness of the sheet steel material of the sheet steel part 24, the difference is at least equal to factor 5, preferably to factor 10. Highly resistant sheet steel is used as the material for the sheet steel part 26, the yield strength should be more than 800 N/mm.sup.2, a typical material is DP 1000, the wall thickness ranges from 0.6 to 0.7 mm, and is in any case less than 1 mm. As compared to a prior art frame side part that has no layered structure, considerable weight savings are achieved, said savings being of at least 25%, often of at least 40%. Despite the lighter layered structure a very high stiffness is achieved, the frame side part is more stable than a prior art one-shell frame side part.

Figure 5:
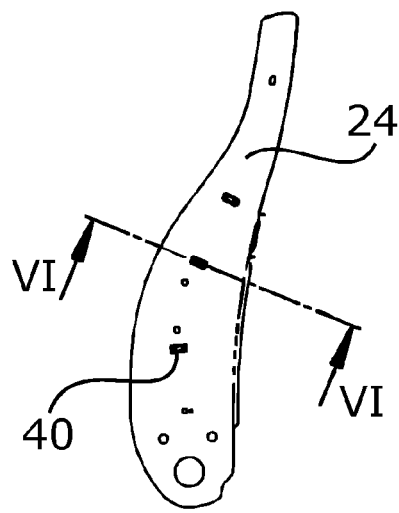

The two layers are bonded together according to prior art. For this purpose, the reader is referred to the second exemplary embodiment viewed in the FIGS. 5 and 6, which refers to a seat back side part 22 virtually built identically to the one in the first exemplary embodiment. In the sheet steel part 24, there are formed apertures 38 which have a rectangular shape. In the reinforcement body 26, there are provided mating clip regions 40 which extend through the apertures 38, see FIG. 6. They additionally also form holding devices for diverse annex parts, such as cables, covers, springs, electric motors, control instruments and the like. In the sheet steel part 26, there can be provided recesses that do not serve for providing a mechanical hold, but merely provide for fastening and holding possibilities on that side of the sheet steel part 24 on which the reinforcement body 26 does not abut. Moreover, on its main face turned away from the sheet steel part 24, but possibly also on its narrow faces, the reinforcement body 26 can have holding means of any type for receiving the component parts mentioned.

Figure 6:
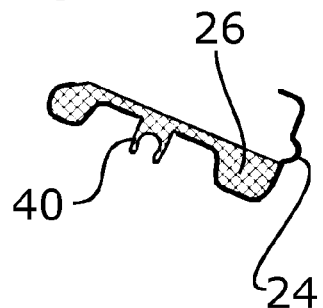
FIG. 6: is a sectional view taken along the section line VI-VI in FIG. 5, FIG. 7: is a perspective illustration of a seat frame side part in the form of an assembly drawing for a third exemplary embodiment.

Sheet steel part 24 and reinforcement body 26 may also be glued or welded together or be joined together in another way. It is also possible for them not to be joined together but to only abut each other. As best shown in FIG. 2, the sheet steel part 26 forms a well 42 conforming to the shape of the reinforcement body 26. The reinforcement body 26 is placed in this well 42 so that it is fixed in the x-z plane. As shown in FIG. 6, the reinforcement body 26 shown therein conforms to the shape of the sheet steel part 24. The reinforcement body 26 fills virtually completely the well-shaped volume of the sheet steel part 24.

It is possible to retrofit the reinforcement body 26 to the sheet steel part 24 by injection molding it thereon, the sheet steel part 24 being more specifically a constituent part of an injection mould. In this way, an intimate and internal bond is achieved.

The reinforcement body 26 can also be made from another material than plastic material. It may for example also be made from a light-weighted material such as light metal, metal foam, a metal grid structure and so on. The sheet steel can also be zigzag shaped.

In the z direction, the reinforcement body 26 has a length that is significantly smaller than that of the sheet steel part 24, for example only 70% of said length, but in particular falling short of 80% of the length. The corresponding dimension in the x direction is also less. As clearly shown in the FIGS. 4 and 5, the sheet steel part 24 is larger than the reinforcement body 26 in the x-z plane, said reinforcement body being completely covered by the sheet steel part 24 as is evident from FIG. 5. The reinforcement body 26 is disposed on purpose in those regions of the sheet steel part 24 that are subjected to high loads. It can be thicker in highly loaded zones than in less loaded zones.

Figure 7:
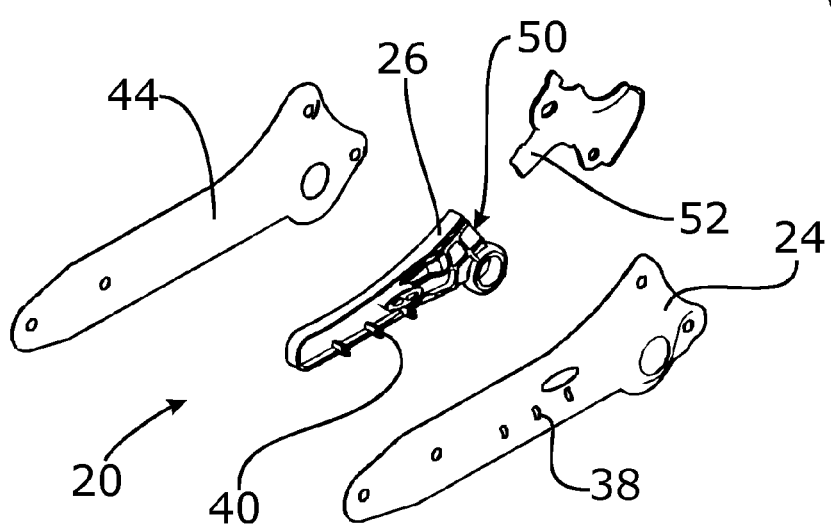

In the third exemplary embodiment shown in FIG. 7, a seat frame side part 20 is formed from a sheet steel part 24 and from an additional sheet steel part 44 and from an interposed reinforcement body 26. The two sheet steel parts 24, 44 largely coincide in shape and again determine the outer shape of the side part 20. In the assembled condition, they form a hollow space in which the reinforcement body 26 is inserted. Again, there are provided apertures 28 in the sheet steel part 24 for the clip regions 40 of the reinforcement body 26 to extend through. In the embodiment shown, such type apertures 38 are not provided in the additional sheet steel part 44, although they can be provided there.

In this third exemplary embodiment, the reinforcement body 26 simultaneously forms a bearing area for a rear rocker 46. For this purpose, it has an annular region 54 that extends through a hole 48 in the two sheet steel parts 24, 44 in the mounted condition. As usual, the rims of these holes 48 determine the mechanical strength of the bearing region, the ring 54 of the reinforcement body 26 ensures favorable bearing properties and fewer losses during sliding friction.

Figure 8:
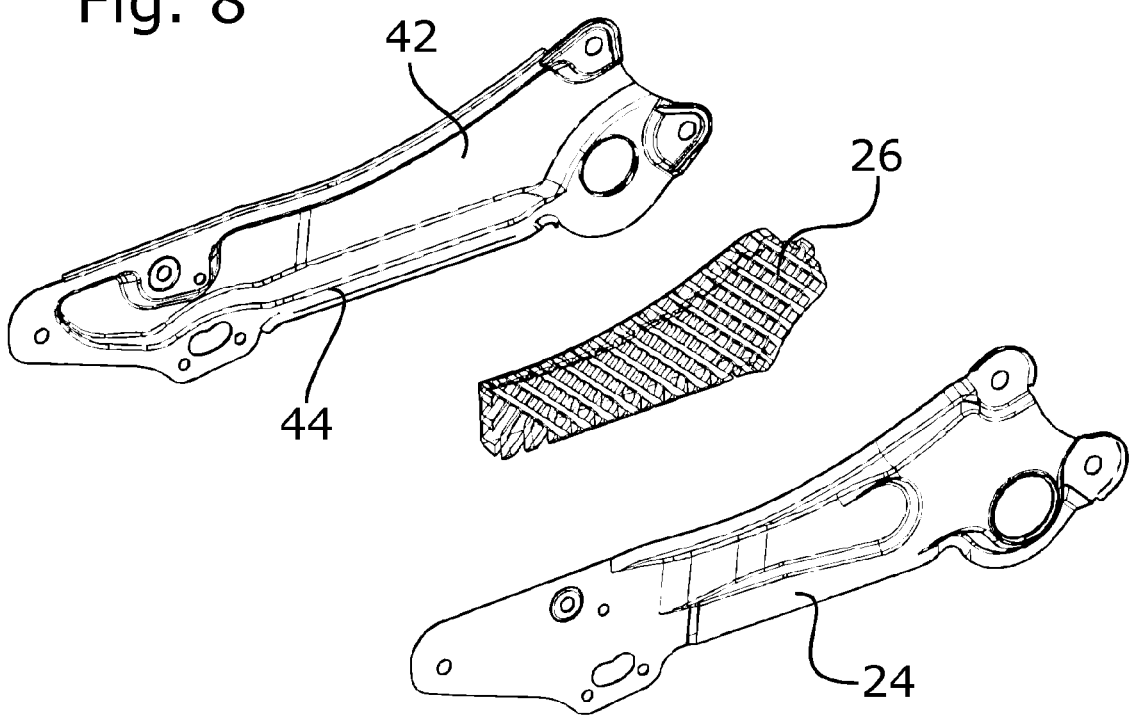
FIG. 8: is a perspective illustration like FIG. 7, but now for a fourth exemplary embodiment.

The fourth exemplary embodiment shown in FIG. 8 again exhibits two sheet steel parts 24, 44 that are configured similar to those in the third exemplary embodiment, except that now the interposed reinforcement body 26 is implemented differently. It has a grid structure as can be seen from the Fig. It remains completely inside the hollow space bonded by the two sheet steel parts 24, 44. It is at least connected to a sheet steel part, for example through a prior art bonding technique, in particular by ultrasonic welding.

Figure 9:
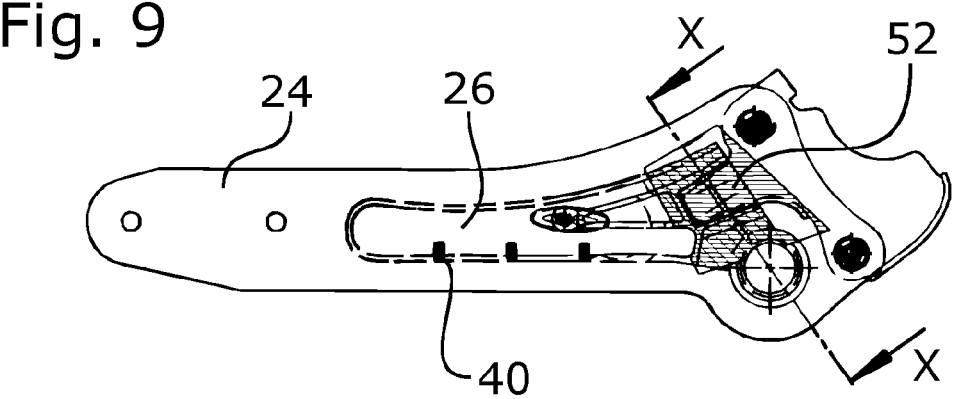
FIG. 9: is a side view for a fifth exemplary embodiment, in parts in a sectional view, of a seat frame side part.
Figure 10:
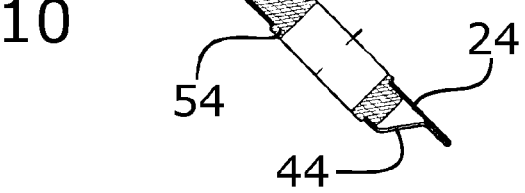
FIG. 10: is a sectional view taken along section line X-X in FIG. 9, FIG. 11: is a perspective illustration of a sixth exemplary embodiment with two reinforcement bodies.

In the fifth exemplary embodiment according to the FIGS. 9 and 10, there is shown again a layered structure with three layers for a seat frame side part 20. FIG. 10 shows the connection of the two sheet steel parts 24, 44 at the respective borders, which can be made by spot welding. The hollow volume between the two sheet steel parts 24, 44 is substantially implemented by the reinforcement body 26. This body now not only has a ring 54 for bearing but also a pocket 50 for a tongue 52 to project into.

Figure 11:
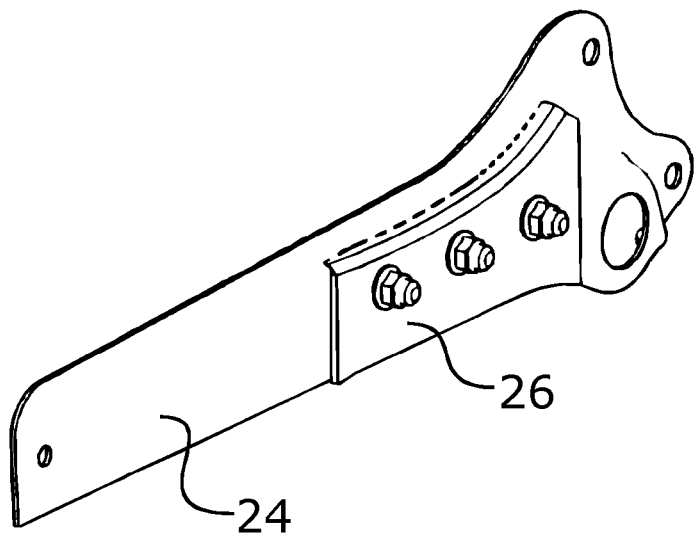
Figure 12:
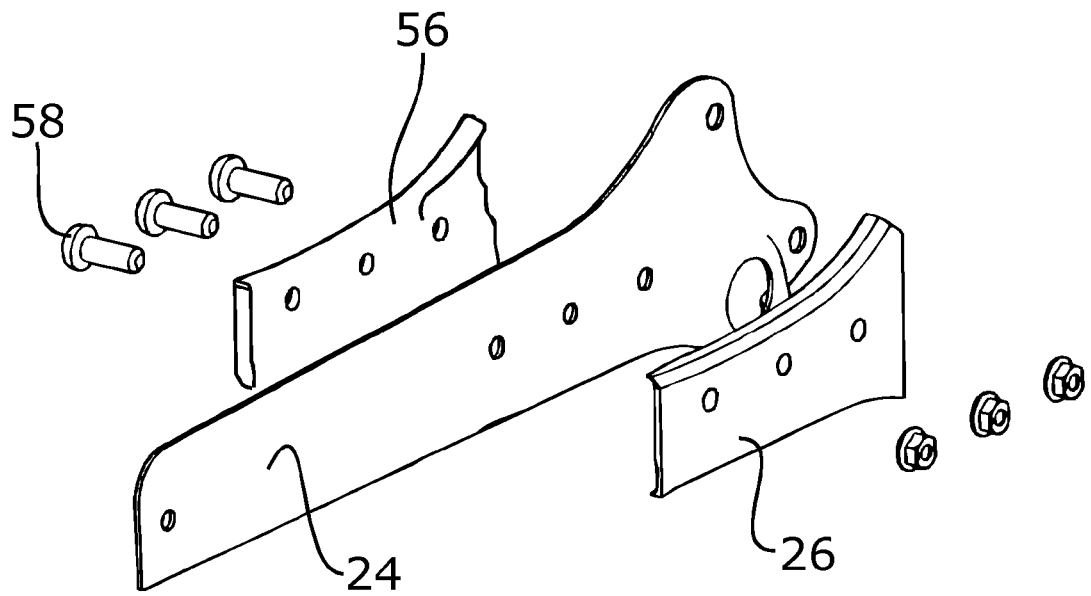
FIG. 12: is a perspective illustration of the sixth exemplary embodiment in the form of an assembly drawing.

In the sixth exemplary embodiment according to the FIGS. 11 and 12, there is shown a layered arrangement in which there are again provided three layers. Now, one sheet steel part 24 is however located between a reinforcement body 26 and an additional reinforcement body 56. In the sheet steel part 24 and in the two reinforcement bodies 26, 56, there are respectively provided three bores for screws 58 to extend therethrough, one nut being associated with a respective one of said screws. In this way, the two reinforcement bodies 26, 56 are solidly connected to the sheet steel part 54 located therein between. In the x direction, the length of the two reinforcement bodies 26, 56 is smaller than 60% of the corresponding length of the sheet steel part 24. In the z direction, the dimension of the sheet steel part 24 is also larger than the corresponding dimension of the two reinforcement bodies 26, 56, the height of which is approximately 80% of the height of the sheet steel part 24. Preferably, the region is stiffened in proximity to a rear rocker joint.

The invention claimed is:

1. A frame of a motor vehicle seat comprising:
a longitudinal guide, a left side part and a right side part, and at least one rocker configured for usage within the motor vehicle, wherein said at least one rocker is arranged between said longitudinal guide and one of said side parts, and wherein each of said side parts comprises a layered structure, each of said side parts having at least two layers, namely a first layer and a second layer, said first layer being a sheet steel part and determining the shape of said side part and said second layer being a reinforcement body and having a material thickness in a y direction that is greater than the material thickness of said sheet steel part, wherein said reinforcement body of said left side part is disposed out of contact with said right side part, said reinforcement body of said right side part is disposed out of contact with said left side part, and said reinforcement body of said left side part being non-integral with said reinforcement body of said right side part,
wherein said reinforcement body comprises a bearing means for pivotal movement, and wherein at least one of said side parts additionally comprises a third layer, said third layer being an additional sheet steel part, whereby said second layer is located between said first and said third layer, said first and said third layer being directly connected via a bond.

2. The frame as set forth in claim 1, wherein said reinforcement body has dimensions in an x-z plane that are smaller than the dimensions of said first layer and said first layer covers said reinforcement body.

3. The frame as set forth in claim 1, wherein said reinforcement body is made from a material having a lower specific weight than the metal from which said sheet steel part is made, the difference being at least 50%.

4. The frame as set forth in claim 1, wherein at least one layer is bonded to a layer located next to said at least one layer.

5. The frame as set forth in claim 1, wherein at least one layer is not bonded to a layer located next to said at least one layer.

6. The frame as set forth in claim 1, wherein said reinforcement body comprises at least one cover reception.

7. The frame as set forth in claim 1, wherein said sheet steel part has a wall thickness of less than 1.5 mm, and is made from highly resistant sheet steel having yield strength of more than 800 N/mm$^2$.

8. The frame as set forth in claim 1, wherein at least one of said side parts is at least one of a seat side part and a seat back side part.

9. The side part as set forth in claim 1, wherein said third layer is an additional sheet steel part, and said first and third layer are welded together.

10. The frame as set forth in claim 1, wherein said reinforcement body is made from a material having a lower specific weight than the metal from which said sheet steel part is made, the difference being at least 100%.

11. The frame as set forth in claim 1, wherein at least one layer is bonded to a layer located next to said at least one layer by at least one of a shape-mating connection, welding and riveting.

12. The frame as set forth in claim 1, wherein said sheet steel part has a wall thickness of less than 1 mm, and is made from a highly resistant sheet steel having a yield strength of more than 800 N/mm$^2$.

13. The frame of claim 1, wherein said reinforcement body is a prefabricated, shaped part.

14. The frame of claim 1, wherein there is no second layer extending between said reinforcement body of said left side part and said reinforcement body of said right side part.

15. The frame of claim 1, wherein in the x direction, the length of said reinforcement body is smaller than 60% of the corresponding length of said sheet steel part.

16. The frame of claim 1, wherein said first and said third layer in assembled condition delimit a hollow space, said reinforcement body being arranged in said hollow space.

17. The frame of claim 1, wherein said first and said third layer are directly bonded together via a welding.

* * * * *